United States Patent
Savchenkov et al.

(10) Patent No.: US 11,410,457 B2
(45) Date of Patent: *Aug. 9, 2022

(54) FACE REENACTMENT

(71) Applicant: Snap Inc., Santa Monica, CA (US)

(72) Inventors: Pavel Savchenkov, Sochi (RU);
Dmitry Matov, Sochi (RU); Aleksandr Mashrabov, Sochi (RU); Alexey Pchelnikov, Sochi (RU)

(73) Assignee: Snap Inc., Santa Monica, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/034,029

(22) Filed: Sep. 28, 2020

(65) Prior Publication Data

US 2021/0012090 A1 Jan. 14, 2021

Related U.S. Application Data

(63) Continuation of application No. 16/251,436, filed on Jan. 18, 2019, now Pat. No. 10,789,453.

(51) Int. Cl.
*G06V 40/16* (2022.01)
*G06N 3/04* (2006.01)
*G06Q 30/02* (2012.01)
*G06T 11/00* (2006.01)

(52) U.S. Cl.
CPC ............ *G06V 40/161* (2022.01); *G06N 3/04* (2013.01); *G06Q 30/0254* (2013.01); *G06Q 30/0269* (2013.01); *G06T 11/001* (2013.01); *G06V 40/174* (2022.01); *G06V 40/178* (2022.01)

(58) Field of Classification Search
CPC .. G06K 9/00228; G06K 9/00302; G06N 3/04; G06Q 30/0254; G06Q 30/0269; G06T 11/001
See application file for complete search history.

(56) References Cited

U.S. PATENT DOCUMENTS

2016/0078280 A1* 3/2016 Tai .................. G06V 40/172
382/118

OTHER PUBLICATIONS

Olszewski et al: "High-Fidelity Facial and Speech Animation for VR HMDs", 2016 (Year: 2016).*

* cited by examiner

*Primary Examiner* — Ruiping Li
(74) *Attorney, Agent, or Firm* — Georgiy L. Khayet (57) ABSTRACT

Provided are systems and a method for photorealistic real-time face reenactment. An example method includes receiving a target video including a target face and a scenario including a series of source facial expressions, determining, based on the target face, one or more target facial expressions, and synthesizing, using the parametric face model, an output face. The output face includes the target face. The one or more target facial expressions are modified to imitate the source facial expressions. The method further includes generating, based on a deep neural network, a mouth region and an eyes region, and combining the output face, the mouth region, and the eyes region to generate a frame of an output video.

33 Claims, 9 Drawing Sheets

FACE REENACTMENT

CROSS-REFERENCE TO RELATED APPLICATION

This application is a Continuation of and claims the priority benefit of U.S. patent application Ser. No. 16/251,436, entitled "FACE REENACTMENT," filed on Jan. 18, 2019. The aforementioned application is incorporated herein by reference in their entirety for all purposes.

TECHNICAL FIELD

This disclosure generally relates to digital image processing. More particularly, this disclosure relates to methods and systems for face reenactment.

BACKGROUND

Face reenactment may include transferring a facial expression of a source individual in a source video to a target individual in a target video or a target image. The face reenactment can be used for manipulation and animation of faces in many applications, such as entertainment shows, computer games, video conversations, virtual reality, augmented reality, and the like.

Some current techniques for face reenactment utilize morphable face models to re-render the target face with a different facial expression. While generation of a face with a morphable face model can be fast, the generated face may not be photorealistic. Some other current techniques for face reenactment can be based on use of deep learning methods to re-render the target face. The deep learning methods may allow obtaining photorealistic results. However, the deep learning methods are time-consuming and may not be suitable to perform a real-time face reenactment on regular mobile devices.

BRIEF DESCRIPTION OF THE DRAWINGS

Embodiments are illustrated by way of example and not limitation in the figures of the accompanying drawings, in which like references indicate similar elements.

DETAILED DESCRIPTION OF EXAMPLE EMBODIMENTS

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

This disclosure relates to methods and systems for face reenactment. The embodiments provided in this disclosure solve at least some issues of known art. The present disclosure can be designed to work on mobile devices, such as smartphones, tablet computers, or mobile phones, in real-time and without connection to the Internet or the need to use server-side computational resources, although the embodiments can be extended to approaches involving a web service or a cloud-based resource.

Some embodiments of the disclosure may allow animation of a target face in a target video or target image with facial expressions belonging to a source face in a source video. The target face can be manipulated by facial expressions of the source face in real time. Embodiments of the present disclosure include building a statistical face morphable model using previously recorded facial images of different individuals, training a deep learning model to synthesize mouth and eyes regions, and performing a real-time facial reenactment. Some embodiments may significantly reduce the computation time for photorealistic facial reenactment and allow to perform photorealistic facial reenactment on a mobile device.

Some embodiments of the present disclosure may allow generating personalized advertisements for a user by replacing a face of an actor in advisements with a face of another individual. Standard advertisements, even when specifically targeting a user, are often skipped by the user because they may not be attracting user's attention or easy to remember. However, if an advertisement features one of user's friends or favorite celebrity, such an advertisement may attract user's attention and make the user to watch the advertisement until the end. The present disclosure can be implemented using a variety of technologies. For example, methods described herein can be implemented by software running on a computer system or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium. It should be noted that methods disclosed herein can be implemented by a computing device such as a mobile device, personal computer, server, network node, and so forth.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

According to one embodiment of the disclosure, an example method for face reenactment may include receiving, by a computing device, a target video. The target video may include at least one target frame. The at least one target frame may include a target face. The method may further include receiving, by the computing device, a source video. The source video may include a source face. The method may further include determining, by a computing device and based on the target face in the at least one frame of the target video, at least a target facial expression. The method may further include determining, by the computing device and based on the source face in a frame of the source video, at least a source facial expression. The method may further include synthesizing, by the computing device and using a parametric face model and a texture model, an output face. The output face may include the target face wherein the target facial expression is modified to imitate the source facial expression. The method may further include generating, by the computing device and based on a DNN, a mouth region and an eyes region. The method may further include combining, by the computing device, the output face, the mouth region, and the eyes region to generate a frame of an output video.

According to one embodiments of the disclosure, a method for face reenactment is provided. The method may include receiving, by a computing device, a target video. The target video may include at least one target frame. The at least one target frame may include a target face. The method may further include receiving, by the computing device, a scenario including a series of source facial expressions. The method may further include determining, by the computing device and based on the target face in the at least one frame of the target video, at least one or more target facial expressions. The method may further include synthesizing, by the computing device and using a parametric face model, an output face. The output face may include the target face. The one or more target facial expressions are modified to imitate the source facial expressions. The method may further include generating, by the computing device and based on a deep neural network (DNN), a mouth region and an eyes region. The method may further include combining, by the computing device, the output face, the mouth region, and the eyes region to generate a frame of an output video.

In some embodiments, the parametric face model may depend on a facial expression, a facial identity and a facial texture.

In some embodiments, the parametric face model may include a template mesh pre-generated based on historical images of faces of a plurality of individuals. The template mesh may include a pre-determined number of vertices. In certain embodiments, the texture model includes set of colors associated with the vertices.

In some embodiments, the individuals can be of different ages, gender, and ethnicity. In certain embodiments, the historical images of faces may include at least one set of pictures belonging to a single individual having a pre-determined number of facial expressions. The facial expressions include at least one of a neutral expression, a mouth-open expression, a smile, and an angry expression.

In some embodiments, the parametric face model may further include a set of blend shapes, the blend shapes representing the facial expressions.

In some embodiments, an input of the DNN may include at least parameters associated with the parametric face model.

In certain embodiments, an input of the DNN may include a previous mouth region and a previous eyes region. The previous mouth region and the previous eyes region can be associated with at least one previous frame of the target video.

In some embodiments, the DNN can be trained using historical images of faces of a plurality of individuals.

According to another embodiment, a system for face reenactment is provided. The system may include at least one processor and a memory storing processor-executable codes. The at least one processor can be configured to implement the operations of the above-mentioned method of face reenactment upon executing the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for face reenactment.

According to one example embodiment, a system for providing personalized advertisements is disclosed. The system may include a database configured to store one or more advertisement videos. The advertisement videos may include at least a target face. The target face can be associated with a first individual. The system may further include a user information collection module configured to receive a user data associated with a user. The user data may include a scenario. The scenario may include a series of source facial expressions. The source facial expressions can be associated with a second individual different from the first individual. The user information collection module can determine, based on the user data, parameters of the source facial expressions. The system may further include a personalized video generation module. The personalized video generation module can be configured to segment a frame of one or more advertisement videos into a first part and a second part. The first part may include the target face and the second part may include a background. The personalized video generation module can modify, based on the parameters of the source facial expressions, the first part of the frame to replace the target face with an output face having the source facial expressions. The personalized video generation module can further combine the modified first part and the second part to obtain an output frame of an output advertisement video.

Frames of advertisement videos stored in the database can be pre-processed to be segmented into the first part including the target face and the second part including the background.

The parameters of the source facial expressions may include a source facial identity and a source facial texture. Modifying the first part of the frame may include determining, based on the target face, a target facial expression, a target facial identity, and a target facial texture as well as replacing the target facial identity with the source facial identity and the target facial texture with source facial texture. Frames of the advertisement videos stored in the database can be pre-processed to include parameters of the target face, the parameters of the target face including the target facial expression, the target facial identity, and the target facial texture.

The user information collection module can be configured to read the user data from a computing device of the user or one or more accounts of the user in one or more social media platforms. The user data may include information concerning interests of the user and one or more images of the user, one or more friends of the user, and one or more favorite celebrities of the user. The user information collection module can analyze the user data to select one or more images of either the user, one or more friends of the user, or one or more favorite celebrities of the user. The user information collection module can determine, based on the one or more selected images, the parameters of the source facial expressions.

The user information collection module can be configured to receive user input from the user. The user input may indicate a list of images to be used for replacement of the target face. The user information collection module can determine, based on the list of images, the parameters of the source facial expressions.

The personalized video generation module can be configured to post the output advertisement video to one or more accounts of the user in one or more social media platforms.

According to another example embodiment, a method for providing personalized advertisements is disclosed. The method may include storing, in a database, one or more advertisement videos. The advertisement videos may include a target face with a first individual. The method may include receiving, by a user information collection module, user data associated with a user. The user data may include a scenario including a series of source facial expressions. The source facial expressions can be associated with a second individual different from the first individual. The method may include determining, by the user information collection and based on the user data, parameters of the source facial expressions. The method may also include segmenting, by a personalized video generation module, a frame of one or more advertisement videos into a first part and a second part. The first part may include the target face and the second part may include a background. The method may include modifying, by the personalized video generation module and based on the parameters of the source face, the first part of the frame to replace the target face with an output face. The output face may include the source facial expressions. The method may also include combining, by the personalized video generation module, the modified first part and the second part to obtain an output frame of an output advertisement video.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

Figure 1:
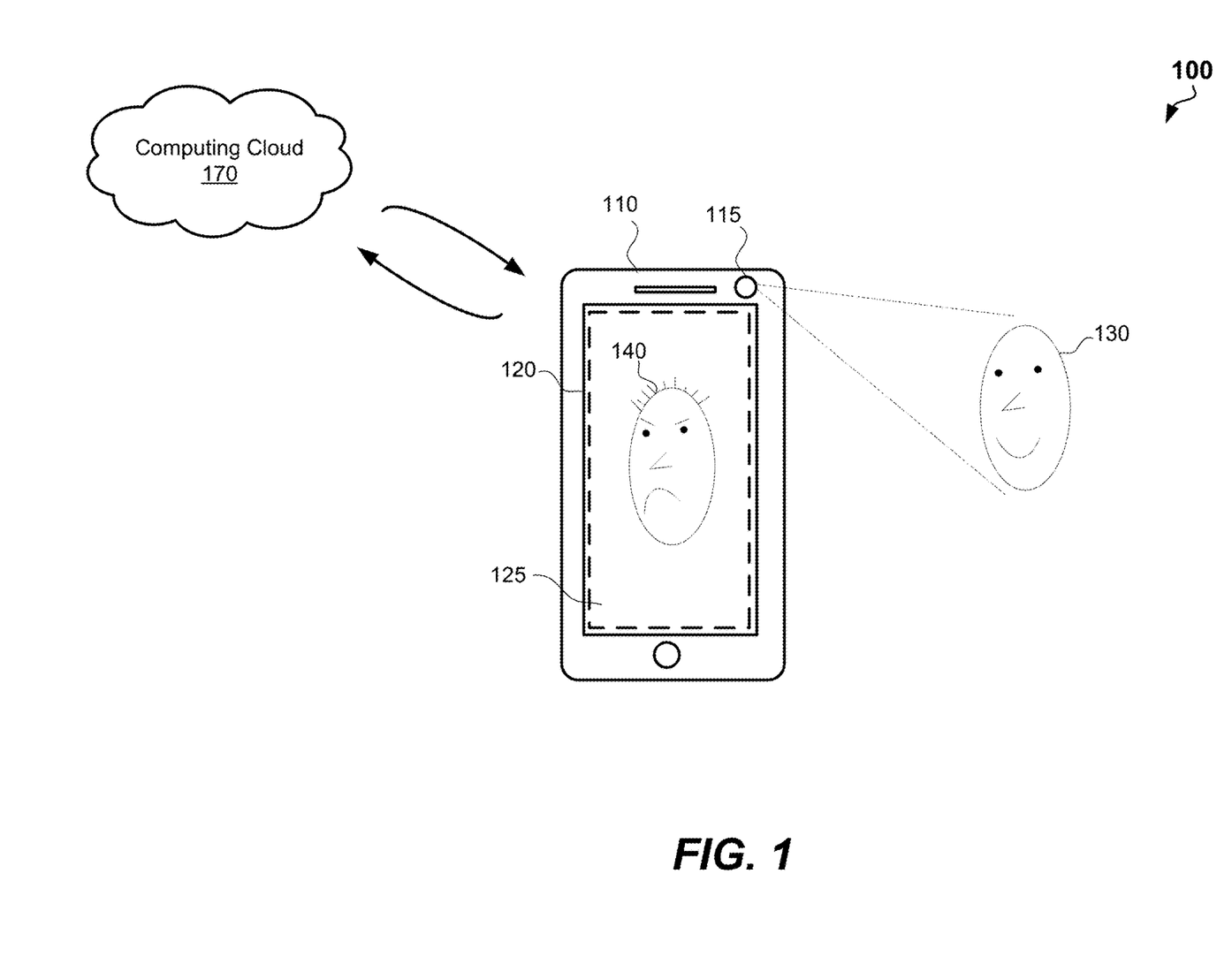
FIG. 1 is a block diagram showing an example environment wherein a method for face reenactment can be implemented.

FIG. 1 shows an example environment 100, wherein a method for face reenactment can be practiced. The environment 100 may include a computing device 110, a user 130, and a cloud-based computing resource 170 (also referred to as a computing cloud 170). The computing device 110 may include a camera 115 and a graphical display system 120. The computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device. The computing device 110 can be communicatively connected to the computing cloud 170 via a data network. The cloud-based computing resource 170 can include computing resources (hardware and software) available at a remote location and accessible over a network (e.g., the Internet). The cloud-based computing resources can be shared by multiple users and can be dynamically re-allocated based on demand. The cloud-based computing resources can include one or more server farms/clusters including a collection of computer servers which can be co-located with network switches or routers. In some embodiments of the disclosure, the computing device 110 can be configured to display a target video 125. The target video 125 may include at least one frame including a target face 140. In some embodiments, the target video 125 may include a single image. In some embodiments, the target video 125 can be pre-recorded and stored in a memory storage of the computing device 125 or in a cloud-based computing resource to which the computing device 125 is communicatively connected to.

In certain embodiments, the computing device 110 may be configured to capture a source video, via, for example, the camera 115. The source video may include at least a face of user 110 (also referred as a source face). In some other embodiments, the source video can be stored in the memory storage of the computing device 110 or in the computing cloud 170.

In some other embodiments, several target videos or images can be pre-recorded and stored in the memory of the computing device 110 or in the computing cloud 170. A user may select the target video or an image to be manipulated and one of the source videos to be used to manipulate the target video or image. According to various embodiments of the disclosure, the computing device 110 can be configured to analyze the source video to extract parameters of facial expressions of user 110. The computing device 110 can be further configured to modify, based on the parameters of the facial expression of the source face, the target video 125 to make the target face 140 to repeat a facial expression of the source face in real time. In further embodiments, the computing device can be further configured to modify the target video 125 to make the target face 140 to repeat a speech of the user 110.

In some embodiments of the disclosure, the computing device may be configured to receive user input. The user input may include one or more scenarios indicating how to control facial parameters of the target face. The scenario may include a sequence of types of facial expressions and types of movements of the target face 140 that the user 130 wants to see in the modified target video 125. The user input may also include environmental variables indicating the types of computing devices (for example, mobile device or desktop) for generating the modified video.

In some further embodiments of the disclosure, the computing device 110 or the cloud-based computing resource 170 may store one or more images of the user 110. The images may include the face of the user 110. The images can also include a set of photographs or a set of videos taken under different conditions. For example, the photographs and videos can be taken from different angles with respect to the face of the user 130 and at different lighting conditions. In some embodiments, the computing device 110 or the computing cloud 170 may store one or more images of another individual, for example a friend of the user 110 or a favorite celebrity of the user 110.

According to some embodiments of the disclosure, the computing device 110 or the cloud-based computing resource 170 can be configured to analyze the stored images of the user 130 in order to extract facial parameters of the user 130. The computing device 110 or the cloud-based computing resource 170 can be further configured to modify the target video 125 by replacing, based on the facial parameters of the user 130, the target face 140 in the target video 125 with the face of the user 130.

Similarly, the computing device 110 or the cloud-based computing resource 170 can be configured to analyze the stored images of the user 130 to extract facial parameters of another individual, for example a friend of the user 130 or a favorite celebrity of the user 130. The computing device 110 can be further configured to modify the target video 125 by replacing, based on the facial parameters of the individual, the target face 140 in the target video 125 with the face of the individual. In some embodiments, the computing device 110 or the cloud-based computing resource 170 can be configured to keep facial expression of the target face 140 unchanged while replacing the target face with the face of the user 130 or another individual. In the example shown in FIG. 2, the computing device 110 includes both hardware components and software components. Particularly, the computing device 110 includes the camera 115 or any other image-capturing device or scanner to acquire digital images. The computing device 110 can further include a processor module 210 and a storage module 215 for storing software components and processor-readable (machine-readable) instructions or codes, which when performed by the processor module 210, cause the computing device 200 to perform at least some steps of methods for face reenactment as described herein.

Figure 2:
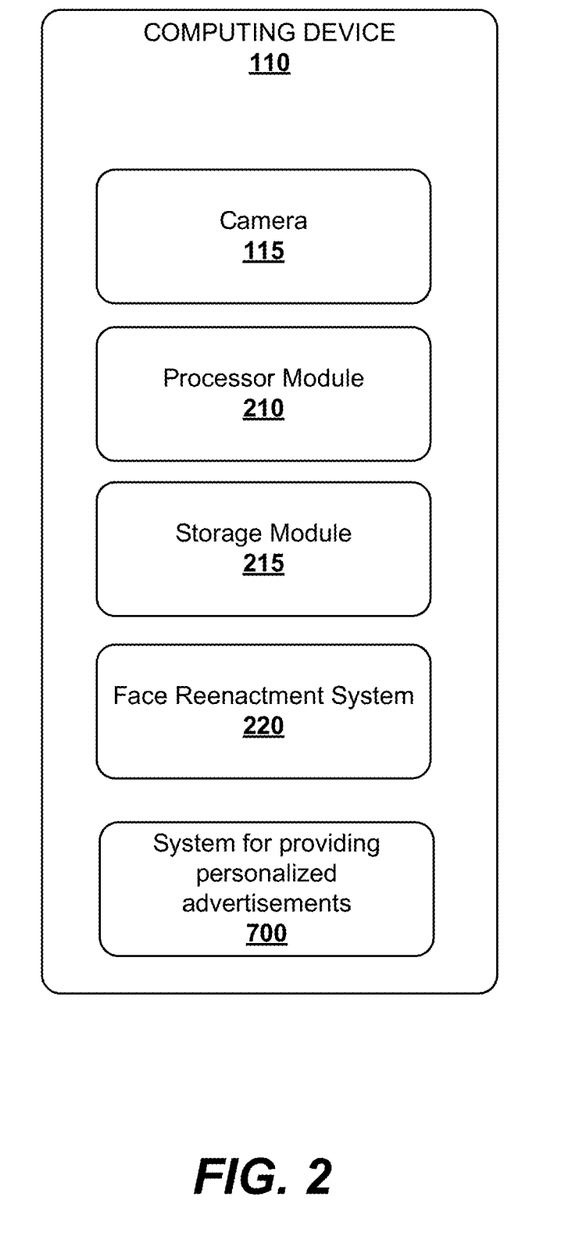
FIG. 2 is a block diagram showing an example embodiment of a computing device for implementing methods for face reenactment.

The computing device 110 can further include a face reenactment system 220, which, in turn, can include hardware components (e.g., a separate processing module and memory), software components, or a combination thereof. The face reenactment system 220 can be configured to perform face reenactment as described herein. The face reenactment system 220 is described in more detail below with reference to FIG. 4.

The computing device 110 can further include a system 700 for providing personalized advertisements. The system 700 is described in more detail below with reference to FIG. 7.

Figure 3:
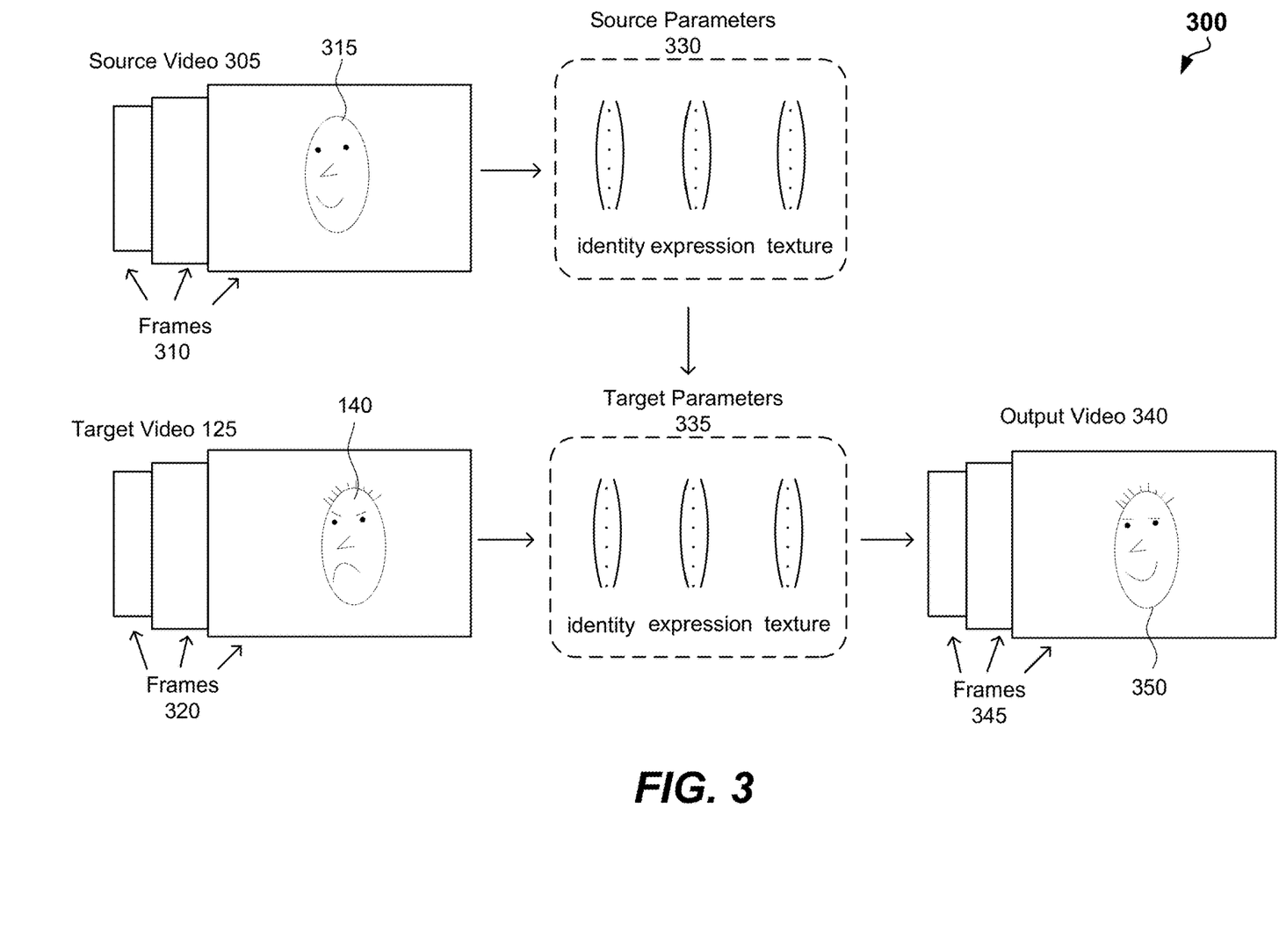
FIG. 3 is a schematic showing a process of face reenactment, according to an example embodiment.

FIG. 3 is a schematic showing functionality 300 of the face reenactment system 220, according to one example embodiment. According to various embodiments of the disclosure, the face reenactment system 220 may receive a source video 305 and a target video 125. The source video 305 may include one or more frames 310. The frames 310 may include a source face 315. The target video 125 may include one or more frames 320. The frames 320 may include a target face 140. In some embodiments, the target video 125 may include only one frame (in other words, a single photograph). The facial expression of the source face 315 and the target face 140 can be different.

In some embodiments of the disclosure, the face reenactment system 220 can be configured to analyze frames 310 of the source video 305 to extract source parameters 330. The source parameters 330 can be extracted by fitting a parametric face model to the source face 315. The parametric face model may include a template mesh. Coordinates of vertices in the template mesh may depend on two parameters: a facial identity and a facial expression. Thus, the source parameters 330 may include a facial identity and facial expression corresponding to the source face 315. The source parameters 330 may further include a texture of the source face 315. The texture may include colors at vertices in the template mesh. In some embodiments, a texture model associated with the template mesh can be used to determine the texture of the source face 315.

In some embodiments of the disclosure, the face reenactment system 220 can be configured to analyze the frames 320 of the target video 305 to extract target parameters 335. The target parameters 335 can be extracted by fitting the parametric face model to the target face 140. The target parameters 335 may include facial identity and facial expression corresponding to the target face 140. The source parameters 330 may further include texture of the target face 140. The texture of the target face 140 can be obtained using the texture model.

In some embodiments of the disclosure, the face reenactment system 220 can be further configured to replace the facial expression in target parameters 335 with the facial expression from the source parameters 330. The face reenactment system 220 can be further configured to synthesize an output face 350 using the parametric face model, texture module, and target parameters 335 with replaced facial expression. The output face 350 can be used to replace the target face 140 in frames of the target video 125 to obtain frames 345 of an output video 340.

Figure 4:
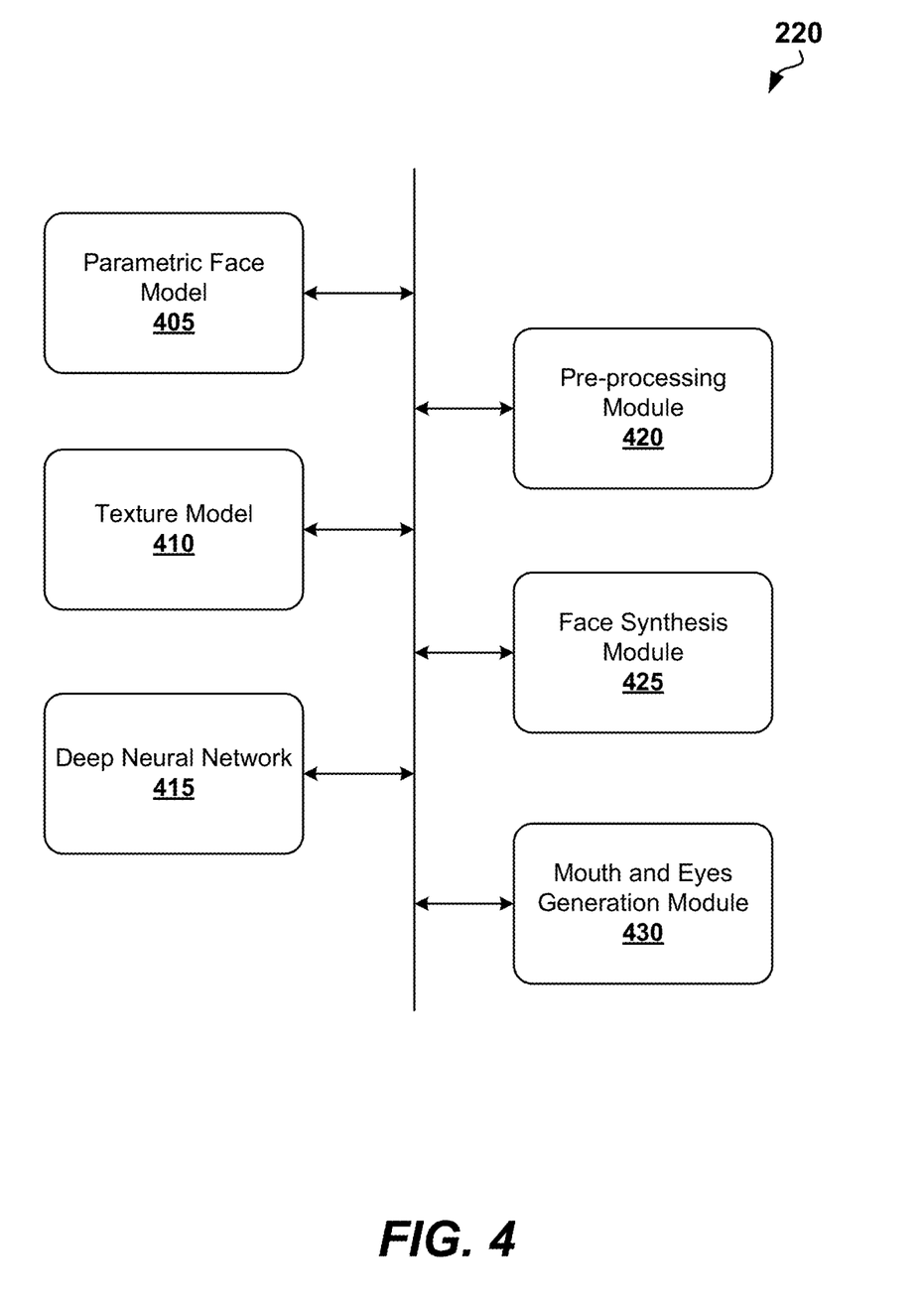
FIG. 4 shows a block diagram of a system for face reenactment, in accordance with an example embodiment.

FIG. 4 is a block diagram of face reenactment system 220, according to one example embodiment. The face reenactment system 220 can include a parametric face model 405, a texture model 410, a DNN 415, a pre-processing module 420, a parameter extracting module 425, a face synthesis module 4325 and a mouth and eyes generation module 430. The modules 405-430 can be implemented as software components for use with hardware devices such as computing device 110, a server, and the like.

In some embodiments of the disclosure, the parametric face model 405 can be pre-generated based on images of a pre-defined number of individuals of different age, gender, and ethnic background. For each individual, the images may include an image of the individual having a neutral facial expression and one or more images of the individual having different facial expressions. The facial expression may include mouth-open, smiling, angry, astonished, and so forth.

The parametric face model 405 may include a template mesh with a pre-determined number of vertices. The template mesh may be represented as 3D triangulation defining a shape of a head. Each of the individuals can be associated with an individual-specific blend shape. The individual-specific blend shape can be adjusted to the template mesh. The individual-specific blend shape may correspond to specific coordinates of vertices in the template mesh. Thus, different images of individuals may correspond to the template mesh of the same structure; however, coordinates of vertices in the template mesh are different for the different images.

In some embodiments of the disclosure, the parametric face model may include a bilinear face model depending on two parameters: facial identity and facial expression. The bilinear face model can be built based on blend shapes corresponding to the images of individuals. Thus, the parametric face model includes the template mesh of a pre-determined structure, wherein the coordinates of vertices depend on facial identity and facial expression.

In some embodiments of the disclosure, the texture model 410 can include a linear space of texture vectors corresponding to images of the individuals. The texture vectors can be determined as colors at vertices of the template mesh.

The parametric face model 405 and the texture model 410 can be used to synthesize a face based on known parameters of facial identity, facial expression, and texture. The parametric face model 405 and the texture model 410 can be also used to determine unknown parameters of facial identity, facial expression, and texture based on a new image of a new face.

Synthesis of a face using the parametric face model 405 and the texture model 410 is not time-consuming; however, the synthesized face may not be photorealistic, especially in the mouth and eyes regions. In some embodiments of the disclosure, the DNN 415 can be trained to generate photorealistic images of the mouth and eyes regions of a face. The DNN 415 can be trained using a collection of videos of speaking individuals. The mouth and eyes regions of speaking individuals can be captured from frames of the videos. The DNN 415 can be trained using a generative adversarial network (GAN) to predict the mouth and eyes regions of the face based on a pre-determined number of previous frames of the mouth and eyes regions and desired facial expression of a current frame. The previous frames of the mouth and eyes regions can be extracted at specific moment parameters for facial expression. The DNN 415 may allow synthesizing mouth and eyes regions with desired parameters for facial expression. The DNN 415 may also allow utilizing previous frames to obtain spatial coherence.

The GAN performs the conditioning on mouth and eyes regions rendered from a face model, current expression parameters, and embedding features from previously generated images and produces the same regions but more photorealistic. The mouth and eyes regions generated using the DNN 415 can be used to replace the mouth and eyes regions synthesized by the parametric face model 405. It should be noted that synthesizing mouth and eyes regions by DNN may be less time-consuming than synthesizing, by a DNN, of an entire face. Therefore, generation of mouth and eyes regions using DNN can be carried out in real time, by, for example, one or more of processors of a mobile device, such as a smartphone or a tablet.

In some embodiments, the pre-processing module 420 can be configured to receive a target video 125 and a source video 305. The target video 125 may include a target face and the source video may include a source face. The pre-processing unit 420 can be further configured to perform a segmentation of at least one frame of the target video to obtain images of the target face 140 and target background. The segmentation can be carried out using neural networks, matting, and smoothing. Similarly, the pre-processing unit can be configured to perform segmentation frames of the source video source video 305 to obtain images of the source face 315 and source background.

In some embodiments, the pre-processing module 420 can be further configured to determine, using the parametric face model 405 and the texture model 410, a set of target parameters based on at least one frame of the target video 125. In some embodiments, the target set of parameters may include target facial identity, target facial expression, and target texture. In some embodiments, the pre-processing module 420 may be further configured to determine, using the parametric face model 405 and the texture model 410, a source set of parameters based on at least one frame of the source video 305. The source set of parameters may include source facial identity, source facial expression, and source texture.

In some embodiments, the face synthesis module 425 can be configured to transfer the facial expression of the source face 310 in a frame of the source video 305 to a target face 140 of the target video. In some embodiments, the face synthesis module 425 can be configured to determine an output set of parameters associated with the parametric face model. In certain embodiments, a deformation transfer can be applied to the target set of parameters to account for the facial expression of the source face 310 and, thereby, obtain the output set of parameters.

In some embodiments, the face synthesis module 425 can be configured to replace the target facial expression in the target set of parameters with the source facial expression to obtain the output set of parameters. The face synthesis module 425 can be further configured to synthesize an output face using the output set of parameters and the parametric face model 405 and texture model 410.

In some embodiments, two-dimensional (2D) deformations can be applied to the target face to obtain photorealistic images of regions of the output face which are hidden in the target face. The parameters of the 2D deformations can be determined based on the source set of parameters of the parametric face model.

In some embodiments, the mouth and eyes generation module 430 can be configured to generate mouth and eyes regions using DNN 415 based on source facial expression and at least one previous frame of the target video 125. The mouth and eyes generation module can be further configured to replace mouth and eyes regions in an output face synthesized with the parametric face model 405 and texture model 410 with mouth and eyes regions synthesized with DNN 415.

In further embodiments, the face reenactment system 220 may include a module for changing a background in the target video, a module for changing a hairstyle or an appearance of the target face, and a module for adding visual effects in the target video. Some further embodiments may include transferring further parameters from the source video 305 to the target video 125, with the further parameters including, but not limited to, head movements, body pose and orientation, and speech.

Figure 5:
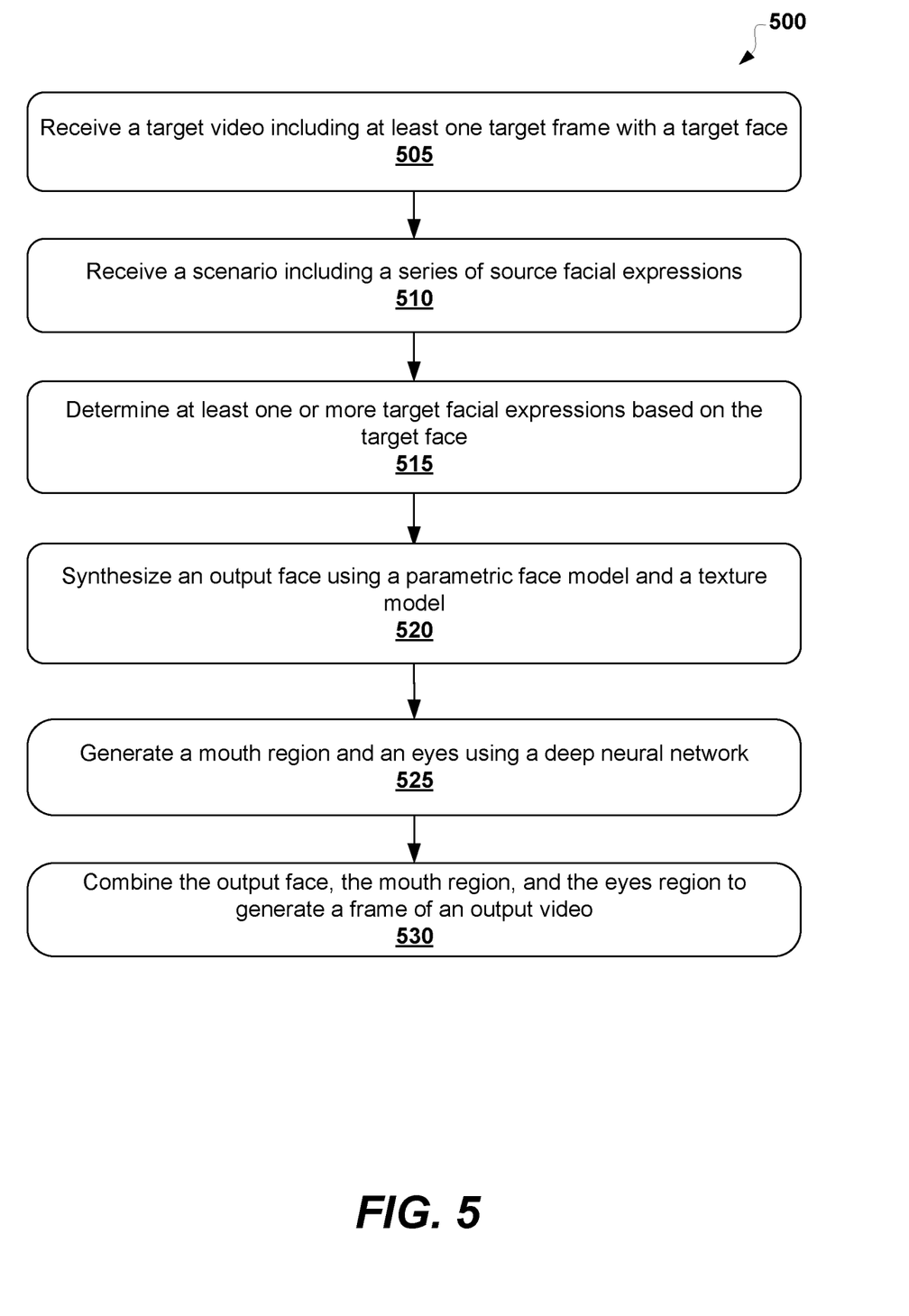
FIG. 5 shows a process flow chart diagram of a method for face reenactment, in accordance with an example embodiment.

FIG. 5 is a flow chart showing a method 500 for face reenactment according to an example embodiment. The method 500 can be performed by computing device 110.

The method 500 can commence in block 505 with receiving, by the computing device 110, a target video. The target video may include at least one target frame. The at least one target frame may include a target face.

In block 510, the method 500 may include receiving, by the computing device 110, a scenario. The scenario may include a series of source facial expressions.

In block 515, the method 500 may include determining, by the computing device 110 and based on the target face in the at least one frame of the target video, at least one or more target facial expressions.

In block 520, the method 500 may include synthesizing, by the computing device 110 and using the parametric model and the texture model 410, an output face. The output face may include the target face. The one or more target facial expressions are modified to imitate the source facial expressions of the series of source facial expressions.

In block 525, the method 500 may include generating, by the computing device and based on DNN 415, a mouth region and an eyes region.

In block 530, the method 500 may include combining, by the computing device 110, the output face, the mouth region, and the eyes region to generate a frame of an output video.

Figure 6:
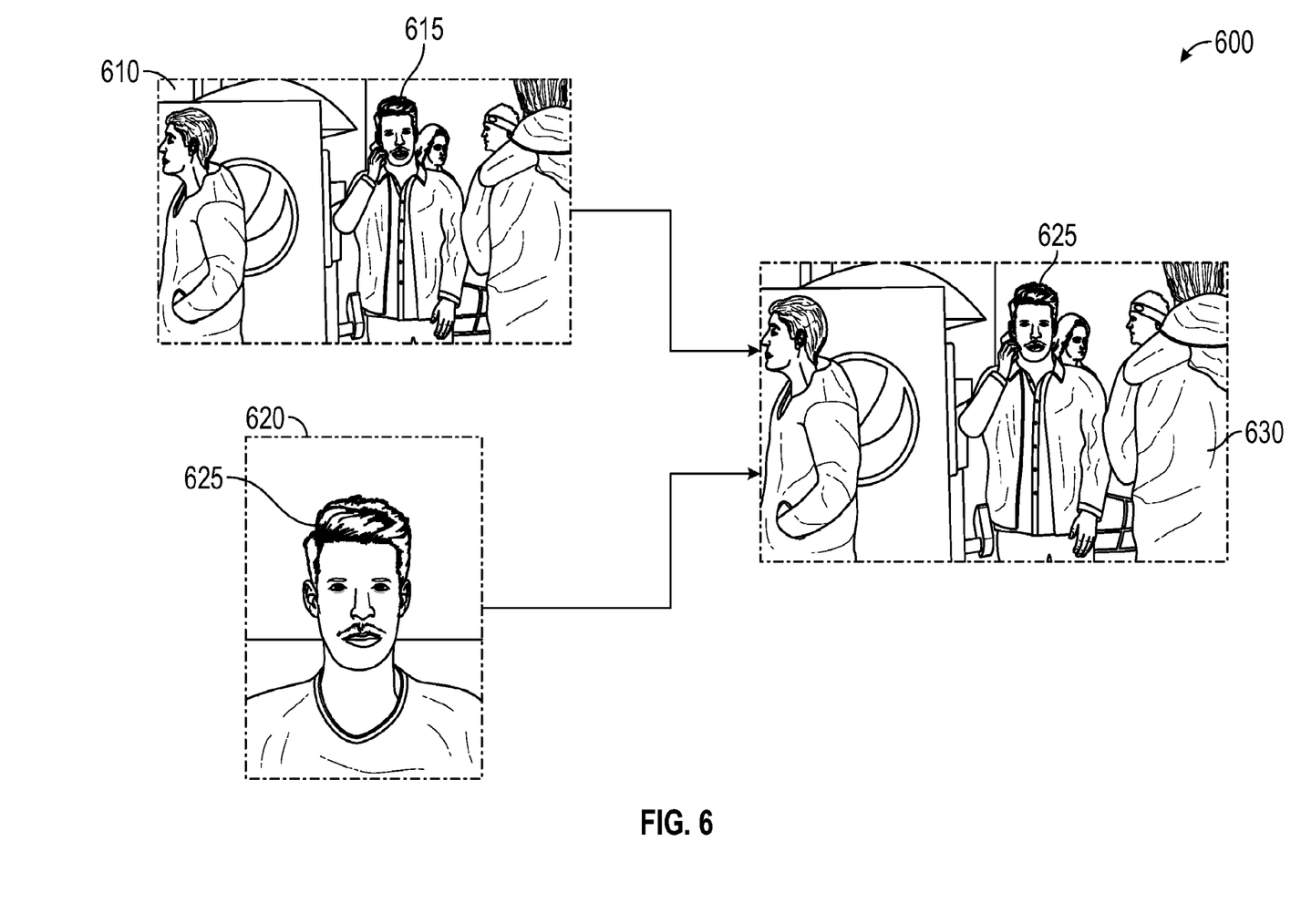
FIG. 6 is a schematic showing generation of a personalized video, according to an example embodiment.

FIG. 6 is a schematic 600 showing generation of a personalized video, according to an example embodiment. In example of FIG. 6, the target video 610 includes an advertisement featuring an actor 615. The face reenactment system 220 can be used to replace the face of the actor 615 in the advertisement with the face of the individual 625 in a source image 620. The output video 630 may include the advertisement shown in the target video 610, wherein the face of the actor 615 is replaced with the face of the individual 625 in the source image 620.

Figure 7:
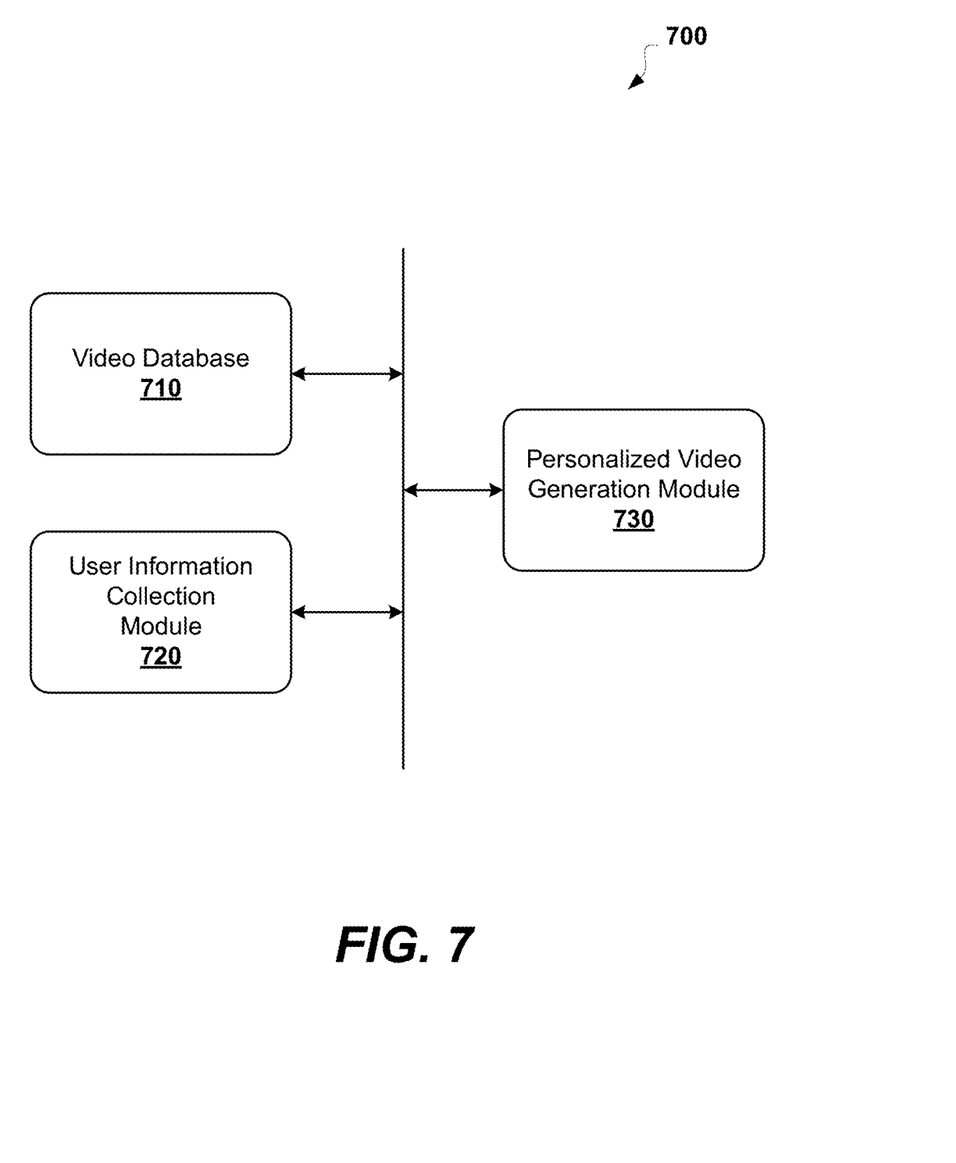
FIG. 7 a block diagram of a system for providing personalized advertisements, according to some example embodiment of the disclosure.

FIG. 7 is a block diagram of a system 700 for providing personalized advertisements, according to some example embodiment of the disclosure. The system 700 may include a video database 710, a user information collection module 720, and a personalized video generation module 730. The modules of the system 700 can be implements as instructions stored in memory of the computing device 110 or computing cloud 170 to be executed by one or more processors of the computing device 110 or computing cloud 170. For example, the system 700 can be implemented in a mobile application, desktop application, or web-based application for one or more social networks.

The video database 710 may store one or more videos. The videos can include previously recorded high-quality video advertisements featuring an actor or multiple actors. The videos may include 2D videos or 3D scenes. The videos can be pre-processed to segment the actor's face and background in each frame and to identify a set of parameters that may be used for further insertion of a source face instead of the face of the actor. The set of parameters may include a face texture, facial expression, face color, facial identity, position and angle of the face, and so forth. The set of parameters may also include a list of manipulations and operations that can be carried out on the actor's face such as the replacement of the actor's face performed in a photo-realistic manner.

The user information collection module 720 can receive information concerning the individual that will be used for personalization. In some embodiments, the user information collection module 720 may receive visual information, for example one or more photographs or one or more videos of the individual. Preferably, the photographs and the videos can be taken under different conditions, such as different positions and angles with respect to the face of individual and different lighting conditions. The user information collection module 720 may process the one or more photographs or one or more videos of the individual to determine a set of parameters associated with the individual. The set of parameters may include a face texture, facial expression, face color, and facial identity associated with the individual. In some embodiments, the module 720 may generate hidden portions of the face of the individual that are occluded in the photographs or videos of the individual. For example, the individual may wear glasses. The hidden portions or parameters (face texture, facial expression, face color, and facial identity) associated with the hidden portions can be generated using a DNN. The DNN can be trained using a GAN to predict the hidden portions of the face of the individual, for example mouth region, eyes regions, and head region.

In some embodiments, the system 700 can be used for social networks. In these embodiments, information collection module 720 can obtain the information concerning the individual from the social network accounts of a user. The information obtained from the social networks may include user's photographs and videos, list of user's friends and interests, and photographs of user's friends. The user can also upload photographs and videos to be used for replacement of an actor in an advertisement. The user may also select photographs and videos to be used for replacement of actor's face in the advertisement. In certain embodiments, the information collection module 720 may obtain information, such as user's photographs and videos, list of user's friends and interests, and photographs of user's friends from data stored in the computing device 110 of the user. In some embodiments, the module 700 may select an individual whose face will be shown in the advertisement (based on user's list of friends and interests). The individual can be the user, one of user' friends or user's favorite celebrities.

The personalized video generation module 730 can generate, based on the user information, a personalized advertisement from one or more videos stored in database 710. In some embodiment, the module 730 may automatically determine user information to use for generation of the personalized advertisement and show the resulting personalized advertisement to the user. In certain embodiments, the user may indicate user information to use (specific photographs or videos of a particular individual) and request generation of the personalized advertisement by inserting a face of the selected individual into the video. For example, the user can create a personalized advertisement with user's own face and then post it on social networks, making it possible for all user's followers to see the advertisement featuring the user. The module 730 may also store, per user request, the personalized advertisement in a memory storage of the computing device 110 of the user. The module 730 may further receive information concerning frequency of views of the personalized advertisements.

The module 730 may replace the face of the actor in the advertisement with the face of the selected person by using a face reenactment system as described above with reference to FIG. 3 and FIG. 4. The module 730 may replace a face texture, face color, and facial identity of the actor with face texture, face color, and facial identity of the selected person. The module 730 can also transfer person's hair, clothes, and so forth to the new image or video. The module 730 may also add an image of glasses over eyes region of the face of the selected person in the new image or video. Similarly, the module 730 may add an image of a headwear (for example, a cap, a hat, a helmet, and so forth) over head of the selected person in the new image or video. The image(s) of the glasses and the headwear can be pre-stored in the computing device 110 of the user or generated. The images of the glasses and headwear can be generated using a DNN. The module 730 may also apply a color to the face of in the new image. For example, the module 730 may add suntan to the face of the selected person.

Figure 8:
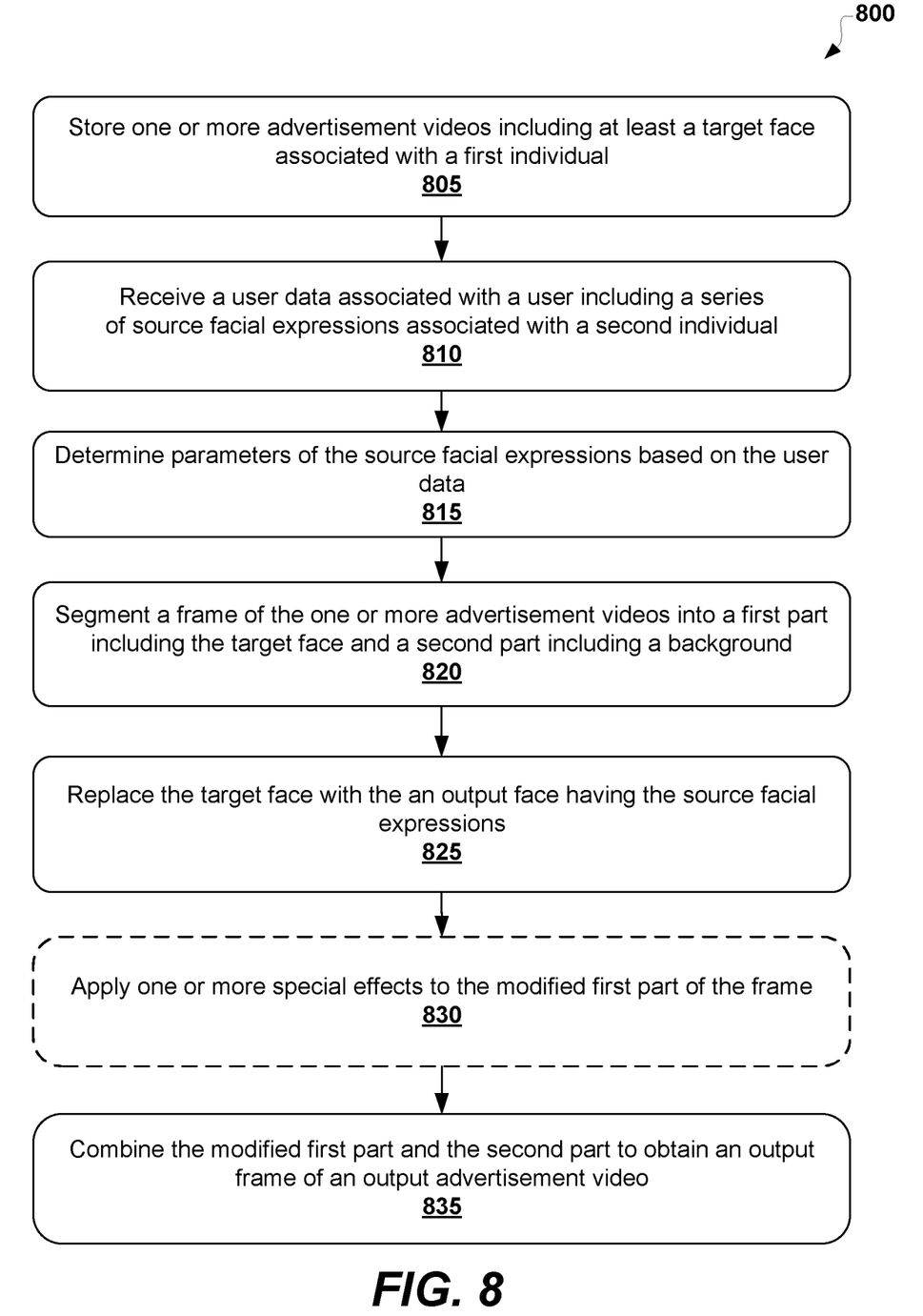
FIG. 8 is a flow chart showing a method for providing personalized advertisements, in accordance with some example embodiments.

FIG. 8 is a flow chart showing a method 500 for providing personalized advertisements, according to some example embodiment of the disclosure. The method 800 can be performed by the system 700 described in FIG. 7.

The method 800 may commence in block 805 with storing, in a database, one or more advertisement videos. The advertisement videos may include at least a target face associated with a first individual.

In block 810, the method 700 may proceed with receiving, by a user information collection module, a user data associated with a user. The user data may include a scenario including a series of source facial expressions. The source facial expressions can be associated with a second individual different from the first individual.

In block 815, the method 800 may include determining, by the user information collection and based on the user data, parameters of the source facial expressions.

In block 820, the method 800 may segment, by a personalized video generation module, a frame of advertisement videos into a first part and a second part. The first part may include the target face and the second part may include a background.

In block 825, the method 800 may modify, by the personalized video generation module and based on the parameters of the source facial expressions, the first part of the frame to replace the target face with an output face. The output face may have the source facial expressions.

In optional block 830, the method 800 may apply, by the personalized video generation module, one or more special effects to the modified first part of the frame. For example, the method 800 may apply suntan to the face in the modified first part, add glasses over eyes region of the face or over the head, or add a cap or hat, a helmet or other headwear over the head or the face.

In block 835, the method 800 may combine, by the personalized video generation module, the modified first part and the second part to obtain an output frame of an output advertisement video.

Figure 9:
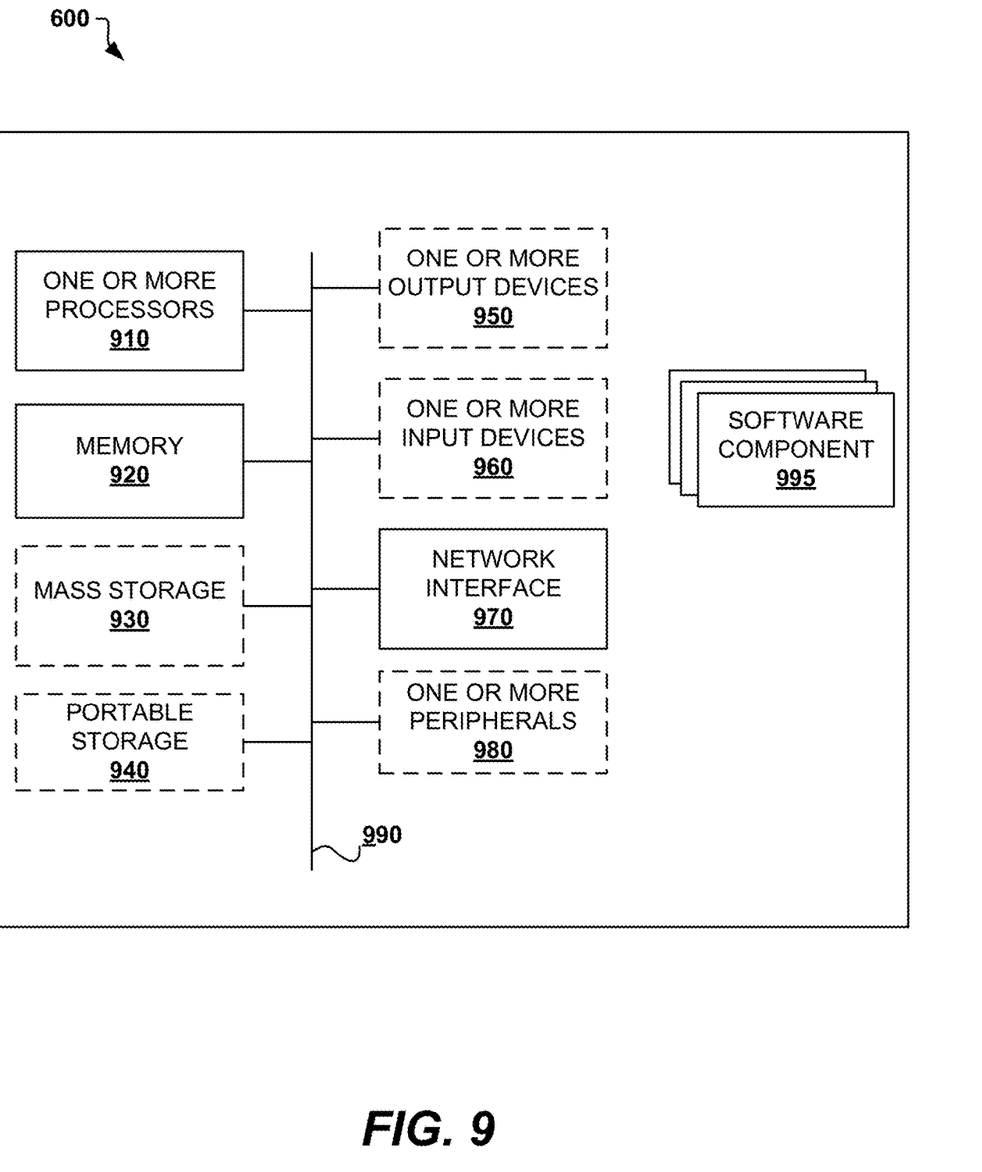
FIG. 9 shows an example computer system that can be used to implement the methods for face reenactment.

FIG. 9 illustrates an example computing system 900 that may be used to implement methods described herein. The computing system 900 may be implemented in the contexts of the likes of computing device 110, face reenactment system 220, parametric face model 405, texture model 410, DNN 415, pre-processing module 420, face synthesis module 425, and mouth and eyes generation module 430.

As shown in FIG. 9, the hardware components of the computing system 900 may include one or more processors 910 and memory 920. Memory 920 stores, in part, instructions and data for execution by processor 910. Memory 920 can store the executable code when the system 900 is in operation. The system 900 may further include an optional mass storage device 930, optional portable storage medium drive(s) 940, one or more optional output devices 950, one or more optional input devices 960, an optional network interface 970, and one or more optional peripheral devices 980. The computing system 900 can also include one or more software components 995 (e.g., ones that can implement the method for face reenactment as described herein).

The components shown in FIG. 9 are depicted as being connected via a single bus 990. The components may be connected through one or more data transport means or data network. The processor 910 and memory 920 may be connected via a local microprocessor bus, and the mass storage device 930, peripheral device(s) 980, portable storage device 940, and network interface 970 may be connected via one or more input/output (I/O) buses.

The mass storage device 930, which may be implemented with a magnetic disk drive, solid-state disk drive, or an optical disk drive, is a non-volatile storage device for storing data and instructions for use by the processor 910. Mass storage device 930 can store the system software (e.g., software components 995) for implementing embodiments described herein.

Portable storage medium drive(s) 940 operates in conjunction with a portable non-volatile storage medium, such as a compact disk (CD), or digital video disc (DVD), to input and output data and code to and from the computing system 900. The system software (e.g., software components 995) for implementing embodiments described herein may be stored on such a portable medium and input to the computing system 900 via the portable storage medium drive(s) 940.

The optional input devices 960 provide a portion of a user interface. The input devices 960 may include an alphanumeric keypad, such as a keyboard, for inputting alphanumeric and other information, or a pointing device, such as a mouse, a trackball, a stylus, or cursor direction keys. The input devices 960 can also include a camera or scanner. Additionally, the system 900 as shown in FIG. 9 includes optional output devices 950. Suitable output devices include speakers, printers, network interfaces, and monitors.

The network interface 970 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 970 may be a network interface card, such as an Ethernet card, optical transceiver, radio frequency transceiver, or any other type of device that can send and receive information. The optional peripherals 980 may include any type of computer support device to add additional functionality to the computer system.

The components contained in the computing system 900 are intended to represent a broad category of computer components. Thus, the computing system 900 can be a server, personal computer, hand-held computing device, telephone, mobile computing device, workstation, minicomputer, mainframe computer, network node, or any other computing device. The computing system 900 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM).

Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for face reenactment have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for face reenactment, the method comprising:
receiving, by a computing device, a target video, the target video including at least one target frame, the at least one target frame including a target face;
receiving, by the computing device, a scenario including a series of source facial expressions;
determining, by the computing device and based on the target face in the at least one frame of the target video, one or more target facial expressions;
synthesizing, by the computing device and using a parametric face model and a texture model, an output face, wherein the parametric face model includes a template mesh pre-generated based on historical images of faces of a plurality of individuals, the template mesh including a pre-determined number of vertices, the output face including the target face, wherein the one or more target facial expressions are modified to imitate the source facial expressions of the series of source facial expressions;
generating, by the computing device and based on a deep neural network (DNN) and at least one previous frame of the target video, a mouth region and an eyes region; and
combining, by the computing device, the output face, the mouth region, and the eyes region to generate a frame of an output video.

2. The method of claim 1, wherein the parametric face model depends on a facial expression, a facial identity, and a facial texture.

3. The method of claim 1, wherein the texture model includes a set of colors associated with the vertices.

4. The method of claim 1, wherein the individuals are of different ages, gender, and ethnicity.

5. The method of claim 1, wherein the historical images of faces includes at least one set of pictures belonging to a single individual having a pre-determined number of facial expressions.

6. The method of claim 5, wherein the facial expressions include at least one of a neutral expression, a mouth-open expression, a smile, and an angry expression.

7. The method of claim 6, wherein the parametric face model includes a set of blend shapes, the blend shapes representing the facial expressions.

8. The method of claim 1, wherein an input of the DNN includes at least parameters associated with the parametric face model.

9. The method of claim 1, wherein an input of the DNN includes a previous mouth region and a previous eyes region, the previous mouth region and the previous eyes region being associated with the at least one previous frame of the target video.

10. The method of claim 1, wherein the DNN is trained using historical images of faces of a plurality of individuals.

11. A system for face reenactment, the system comprising at least one processor, a memory storing processor-executable codes, wherein the at least one processor is configured to implement the following operations upon executing the processor-executable codes:

receiving a target video, the target video including at least one target frame, the at least one target frame including a target face;
receiving, by the computing device, a scenario including a series of source facial expressions;
determining, based on the target face in the at least one frame of the target video, at least one or more target facial expressions;
synthesizing, using a parametric face model and a texture model, an output face, wherein the parametric face model includes a template mesh pre-generated based on historical images of faces of a plurality of individuals, the template mesh including a pre-determined number of vertices, the output face including the target face, wherein the one or more target facial expressions are modified to imitate the source facial expressions of the series of source facial expressions;
generating, based on a deep neural network (DNN) and at least one previous frame of the target video, a mouth region and an eyes region; and
combining the output face, the mouth region, and the eyes region to generate a frame of an output video.

12. The system of claim 11, wherein the parametric face model depends on a facial expression, a facial identity, and a facial texture.

13. The system of claim 11, wherein the individuals are of different ages, gender, and ethnicity.

14. The system of claim 11, wherein the texture model includes a set of colors associated with the vertices.

15. The system of claim 11, wherein the historical images of faces include at least one set of pictures belonging to a single individual having a pre-determined number of facial expressions.

16. The system of claim 15, wherein the facial expressions include:
at least one of a neutral expression, a mouth-open expression, a smile, and an angry expression; and
the parametric face model includes a set of blend shapes, the blend shapes representing the facial expressions.

17. The system of claim 11, wherein an input of the DNN includes at least one of the following:
parameters associated with the parametric face model; and
a previous mouth region and a previous eyes region, the previous mouth region and the previous eyes region being associated with the at least one previous frame of the target video.

18. The system of claim 11, wherein the DNN is trained using historical images of faces of a plurality of individuals.

19. A non-transitory processor-readable medium having instructions stored thereon, which when executed by one or more processors, cause the one or more processors to implement a method for face reenactment, the method comprising:
receiving a target video, the target video including at least one target frame, the at least one target frame including a target face;
receiving, by the computing device, a scenario including a series of source facial expressions;
determining, based on the target face in the at least one frame of the target video, at least one or more target facial expressions;
synthesizing, using a parametric face model and a texture model, an output face, wherein the parametric face model includes a template mesh pre-generated based on historical images of faces of a plurality of individuals, the template mesh including a pre-determined number of vertices, the output face including the target face, wherein the one or more target facial expressions are modified to imitate the source facial expressions of the series of source facial expressions;

generating, based on a deep neural network (DNN) and at least one previous frame of the target video, a mouth region and an eyes region; and combining the output face, the mouth region, and the eyes region to generate a frame of an output video.

20. A system for providing personalized advertisements, the system comprising:

a database configured to store one or more advertisement videos, the one or more advertisement videos including at least a target face, the target face being associated with a first individual;

a user information collection module configured to:
receive a user data associated with a user, the user data including a scenario, the scenario including a series of source facial expressions, the source facial expressions being associated with a second individual, the second individual being different from the first individual; and
determine, based on the user data, parameters of the source facial expressions; and a personalized video generation module configured to:
segment a frame of the one or more advertisement videos into a first part and a second part, the first part including the target face and the second part including a background;
modify, based on the parameters of the source facial expressions and using a parametric face model, the first part of the frame to replace the target face with an output face, wherein the parametric face model includes a template mesh pre-generated based on historical images of faces of a plurality of individuals, the template mesh including a pre-determined number of vertices, the output face having the source facial expressions; and
combine the modified first part and the second part to obtain an output frame of an output advertisement video.

21. The system of claim 20, wherein the database is configured to store pre-processed advertisement videos, the pre-processed advertisement videos including frames segmented into the first part including the target face and the second part including the background.

22. The system of claim 20, wherein:
the parameters of the source facial expression include a source facial identity and a source facial texture; and
modifying the first part of the frame includes:
determining, based on the target face, a target facial expression, a target facial identity, and a target facial texture; and
replacing the target facial indent with the source facial identity and the target facial texture with source facial texture.

23. The system of claim 22, wherein the database is configured to store pre-processed advertisement videos, wherein frames of the pre-processed advertisement videos include parameters of the target face, the parameters of the target face including the target facial expression, the target facial identity, and the target facial texture.

24. The system of claim 20, wherein the user information collection module is configured to:
read the user data from one or more accounts of the user in one or more social media platforms, wherein the user data includes information concerning interests of the user and images of the user, one or more friends of the user, or one or more favorite celebrities of the user;
analyze the user data to select one or more images from the images of the user, one or more friends of the user, or one or more favorite celebrities of the user; and
determine, based on the one or more selected images, the parameters of the source facial expressions.

25. The system of claim 20, wherein the user information collection module is configured to:
receive, from the user, a user input indicating a list of images to be used for replacement of the target face; and
determine, based on the list of images, the parameters of the source facial expressions.

26. The system of claim 20, wherein the personalized video generation module is further configured to post the output advertisement video in one or more accounts of the user in one or more social media platforms.

27. A method for providing personalized advertisements, the method comprising:

storing, in a database, one or more advertisement videos, the one or more advertisement videos including at least a target face, the target face being associated with a first individual;

receiving, by a user information collection module, a user data associated with a user, the user data including a scenario, the scenario including a series of source facial expressions, the source facial expressions being associated with a second individual, the second individual being different from the first individual;

determining, by the user information collection module and based on the user data, parameters of the source facial expressions;

segmenting, by a personalized video generation module, a frame of the one or more advertisement videos into a first part and a second part, the first part including the target face and the second part including a background;

modifying, by the personalized video generation module, based on the parameters of the source facial expressions and using a parametric face model, the first part of the frame to replace the target face with an output face, wherein the parametric face model includes a template mesh pre-generated based on historical images of faces of a plurality of individuals, the template mesh including a pre-determined number of vertices, the output face having the source facial expressions; and combining, by the personalized video generation module, the modified first part and the second part to obtain an output frame of an output advertisement video.

28. The method of claim 27, further comprising storing, in the database, pre-processed advertisement videos, the pre-processed advertisement videos including frames segmented into the first part including the target face and the second part including the background.

29. The method of claim 27, wherein:
the parameters of the source facial expressions include a source facial identity and a source facial texture; and
modifying the first part of the frame includes:
determining, based on the target face, a target facial expression, a target facial identity, and a target facial texture; and
replacing the target facial indent with the source facial identity and the target facial texture with source facial texture.

30. The method of claim 29, further comprising storing, in the database, pre-processed advertisement videos, wherein frames of the pre-processed advertisement videos include parameters of the target face, the parameters of the target face including the target facial expression, the target facial identity, and the target facial texture.

31. The method of claim 27, further comprising:
- reading, by the user information collection module, the user data from one or more accounts of the user in one or more social media platforms, wherein the user data includes information concerning interests of the user and images of the user, one or more friend of the user, one or more favorite celebrities of the user;
- analyzing, by the user information collection module, the user data to select one or more images from the images of the user, one or more friend of the user, one or more favorite celebrities of the user; and
- determining, by the user information collection module and based on the one or more selected images, the parameters of the source facial expressions.

32. The method of claim 27, further comprising:
- receiving, by the user information collection module, a user input indicating a list of images to be used for replacement of the target face; and
- determining, by the user information collection module and based on the list of images, the parameters of the source facial expressions.

33. The method of claim 27, further wherein the personalized video generation module is further configured to post the output advertisement video in one or more accounts of the user in one or more social media platforms.

* * * * *